United States Patent
Kim et al.

(10) Patent No.: US 9,970,492 B2
(45) Date of Patent: May 15, 2018

(54) T-S CURVE CORRECTION METHOD FOR CLUTCH SYSTEM

(71) Applicant: Hyundai Autron Co., Ltd., Seongnam-si (KR)

(72) Inventors: Min Hyo Kim, Gunpo-si (KR); Jin Won No, Seongnam-si (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 0 days. days.

(21) Appl. No.: 15/351,668

(22) Filed: Nov. 15, 2016

(65) Prior Publication Data

US 2017/0138420 A1 May 18, 2017

(30) Foreign Application Priority Data

Nov. 17, 2015 (KR) .................. 10-2015-0161023

(51) Int. Cl.
*F16D 48/06* (2006.01)

(52) U.S. Cl.
CPC ........ *F16D 48/06* (2013.01); *F16D 2500/104* (2013.01); *F16D 2500/304* (2013.01); *F16D 2500/50245* (2013.01)

(58) Field of Classification Search
None
See application file for complete search history.

(56) References Cited

U.S. PATENT DOCUMENTS

| | | | |
|---|---|---|---|
| 9,316,271 B2* | 4/2016 | Moorman | F16D 25/14 |
| 2013/0282217 A1* | 10/2013 | Oel | B60W 20/40 |
| | | | 701/22 |
| 2015/0167756 A1* | 6/2015 | Yoon | F16D 48/06 |
| | | | 701/68 |
| 2015/0274146 A1* | 10/2015 | Doering | B60W 10/10 |
| | | | 477/5 |
| 2016/0377131 A1* | 12/2016 | Ziefle | F16D 48/064 |
| | | | 701/22 |

FOREIGN PATENT DOCUMENTS

| | | | |
|---|---|---|---|
| CN | 103786714 A | | 5/2014 |
| CN | 104712676 A | | 6/2015 |
| CN | 104712684 A | | 6/2015 |
| CN | 104728308 A | | 6/2015 |
| CN | 105020297 A | | 11/2015 |
| JP | 2007-139121 A | | 6/2007 |
| KR | 10-2015-0070901 A | | 6/2015 |
| WO | WO 2015/120850 A1 | | 8/2015 |

* cited by examiner

*Primary Examiner* — Justin Holmes
(74) *Attorney, Agent, or Firm* — Morgan, Lewis & Bockius LLP

(57) ABSTRACT

A T-S curve correction method for a clutch system may include: detecting differences between actual positions of a clutch in first and second torque regions and a position on a T-S curve; determining whether the difference between the actual position in the first torque region and the position on the T-S curve is equal to or more than a first reference value; determining whether the difference between the actual position in the second torque region and the position on the T-S curve is equal to or less than a third reference value, when the difference of the actual position in the first torque region is equal to or more than the first reference value; and correcting the slope of the T-S curve in the increasing direction, when the difference of the actual position in the second torque region is equal to or less than the third reference value.

6 Claims, 2 Drawing Sheets

T-S CURVE CORRECTION METHOD FOR CLUTCH SYSTEM

CROSS-REFERENCES TO RELATED APPLICATIONS

The present application claims priority to Korean application number 10-2015-0161023, filed on Nov. 17, 2015, which is incorporated by reference in its entirety.

BACKGROUND OF THE INVENTION

The present invention relates to a T-S (Torque-Stroke) curve correction method for a clutch system, and more particularly, a T-S curve correction method for a clutch system, which is capable of preventing an occurrence of slip by correcting a T-S curve based on differences between actual positions at low and high torques and a position on a T-S curve.

In general, a transmission for transmitting power of an engine includes a clutch which is one of transmission parts and serves to couple a driving shaft engaged with a gear to the engine in order to transmit power, or separate the driving shaft from the engine in order to disconnect power.

In order for the clutch to transmit torque of the engine, the position of the clutch is changed by an actuator such as a solenoid or motor. The torque capacity of the clutch based on a moving distance of the clutch may be expressed as a T-S (Torque-Stroke) curve, and torque transmitted by the clutch based on a moving distance of the clutch may be accurately estimated only when the T-S curved is trained by abrasion, thermal deformation and vehicle deviation.

During clutch control of a DCT (Dual Clutch Transmission), input engine torque may be reliably transmitted to a clutch, only when the relation between clutch torque and stroke, that is, the T-S curve is accurately recognized.

For reference, the DCT includes two clutches connected to two input shafts and one output shaft, unlike a conventional single-disc clutch transmission system. The input shaft indicates a rod-shaped shaft for transmitting power to a predetermined position through a rotational motion or linear reciprocating motion.

The engine is connected to the input shafts by the clutch, and the input shafts are connected to the output shaft through a gear and transmit power to wheels. The clutch is a kind of shaft coupling device which is used to connect or disconnect shafts to or from each other, and temporarily disconnects or connects power of the engine. The clutch is used when the gear is shifted to change speed.

A general 7-speed DCT includes first and second input shafts and first and second clutches. The first input shaft is connected to odd-numbered (1, 3, 5, 7) gears, and the first clutch couples a gear stage to the engine. The second input shaft is connected to a reverse gear (R) and even-numbered gears (2, 4, 6), and the second clutch couples a gear stage to the engine.

While a vehicle is operated in a state where the vehicle is connected to the output shaft by an odd-numbered gear of the first input shaft, gear shifting may be performed by applying an even-numbered gear of the second input shaft and raising the torque of the second clutch at the same time as the torque of the first clutch is removed. At this time, an engaged or coupled clutch (for example, the second clutch) may be set to an on-going clutch, and a decoupled clutch (for example, the first clutch) may be set to an off-going clutch.

When the DCT is controlled, a clutch actuator 110, a gear shifting device 120 and a controller 130 are required as illustrated in FIG. 1. The clutch actuator 110 serves to engage or disengage a clutch, the gear shifting device 120 serves to perform gear shifting by controlling a shift fork of the transmission, and the controller 130 controls the gear shifting device 120 according to a vehicle speed and throttle valve opening degree.

The gear shifting device 120 not only serves to simply perform gear shifting, but also needs to have a pre-select function of performing gear shifting only by switching between the coupling state and decoupling state of the two clutches in a state where gear shift stages belonging to two transmission systems divided into odd-numbered stages and even-numbered stages are engaged one by one at the same time.

Furthermore, the gear shifting device 120 must have an active interlock function of maintaining a transmission lug of a transmission system in a neutral state, the transmission system having no part in gear shifting such that two gear shift stages belonging to the same transmission system are not engaged with each other at the same time. The gear shifting device 120 must be able to provide the above-described basic functions through a simple configuration and structure, and secure stable and reliable operability as well as durability.

As described above, the DCT can reliably transmit input engine torque to the clutch, only when the relation between clutch torque and stroke (T-S curve) is accurately recognized during clutch control. If a clutch torque equal to or more than a normal value is matched with a specific stroke on the T-S curve, an excessive direct-connection shock may occur. On the other hand, if a clutch torque less than the normal value is applied, the engine may be run up.

Furthermore, although the T-S curve was correctly matched at the initial stage, the T-S curve may differ from an actual situation, depending on clutch abrasion, thermal deformation or mass production deviation. In order to prevent an abnormality of the transmission system (or clutch system), for example, an occurrence of slip or gear shifting shock, a difference value between an actual position at low or high torque and a position on the T-S curve needs to be determined in order to properly correct the slope of the T-S curve in the increasing or decreasing direction.

The related art of the present invention is disclosed in Korean Patent Publication No. 10-2015-0070901 published on Jun. 25, 2015 and entitled "Method for correcting clutch characteristic of DCT".

BRIEF SUMMARY

Various embodiments of the present invention are directed to a T-S (Torque-Stroke) curve correction method for a clutch system, which is capable of preventing an occurrence of slip by correcting a T-S curve based on differences between actual positions at low and high torques and a position on a T-S curve.

Also, various embodiments of the present invention are directed to a T-S curve correction method for a clutch system, which is capable of determining differences between actual positions at low and high torques and a position on a T-S curve, and correcting the slope of the T-S curve, thereby preventing an occurrence of slip or gear shifting shock.

In one embodiment, a T-S curve correction method for a clutch system may include: detecting, by a controller, differences between actual positions of a clutch in first and second torque regions and a position on a T-S curve; determining whether the difference between the actual position in the first torque region and the position on the T-S curve is equal to or more than a first reference value; determining whether the difference between the actual position in the second torque region and the position on the T-S curve is equal to or less than a third reference value, when the difference between the actual position in the first torque region and the position on the T-S curve is equal to or more than the first reference value; and correcting the slope of the T-S curve in the increasing direction, when the difference between the actual position in the second torque region and the position on the T-S curve is equal to or less than the third reference value.

The T-S curve correction method may further include: determining, by the controller, whether the difference between the actual position in the first torque region and the position on the T-S curve is equal to or less than a second reference value, when the difference between the actual position in the first torque region and the position on the T-S curve is less than the first reference value; determining whether the difference between the actual position in the second torque region and the position on the T-S curve is equal to or more than a fourth reference value, when the difference between the actual position in the first torque region and the position on the T-S curve is equal to or less than the second reference value; and correcting the slope of the T-S curve in the decreasing direction, when the difference between the actual position in the second torque region and the position on the T-S curve is equal to or more than the fourth reference value.

The first torque region may correspond to a low-torque region between the low-torque region and a high-torque region which are previously set in the entire torque region, and the second torque region may correspond to the high-torque region.

A second reference value may be additionally used as a reference value for comparing the actual position in the first torque region to the position on the T-S curve, in addition to the first reference value.

The first and second reference values may be set to the same value in the first torque region.

A fourth reference value may be additionally used as a reference value for comparing the actual position in the second torque region to the position on the T-S curve, in addition to the third reference value.

The third and fourth reference values may be set to the same value in the second torque region.

DETAILED DESCRIPTION

Hereafter, a T-S (Torque-Stroke) curve correction method for a clutch system in accordance with an embodiment of the invention will be described in detail with reference to the accompanying drawings.

Through the specification, it should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

The present embodiment provides a method for determining differences between actual positions at low and high torques and a position on a T-S curve indicating the relation between transmittable torque and clutch position, and correcting the slope of the T-S curve in the increasing or decreasing direction in a dry clutch system which controls the position of a clutch using a motor and has an incorrect temperature characteristic because a clutch for transmitting or blocking power in a transmission for transmitting power of a vehicle engine is operated in an air-cooling manner.

For reference, a wet transmission increases the position of a solenoid, and converts the position into clutch torque. However, since a dry transmission (for example, DCT) mainly uses a motor, the dry transmission increases the position (stroke) of the motor and converts the position into clutch torque.

That is, while the position s (stroke) of the motor is increased, a clutch disk is pushed to generate a force F. The force F is multiplied by a friction coefficient $\mu$, thereby defining a torque t applied to the clutch disk, that is, a T-S curve characteristic.

Thus, in order to satisfy a target clutch torque, a target motor position is calculated and converted into a T-S curve. Then, a TCU (Transmission Control Unit) controls the target motor position to raise the clutch torque.

Figure 2:
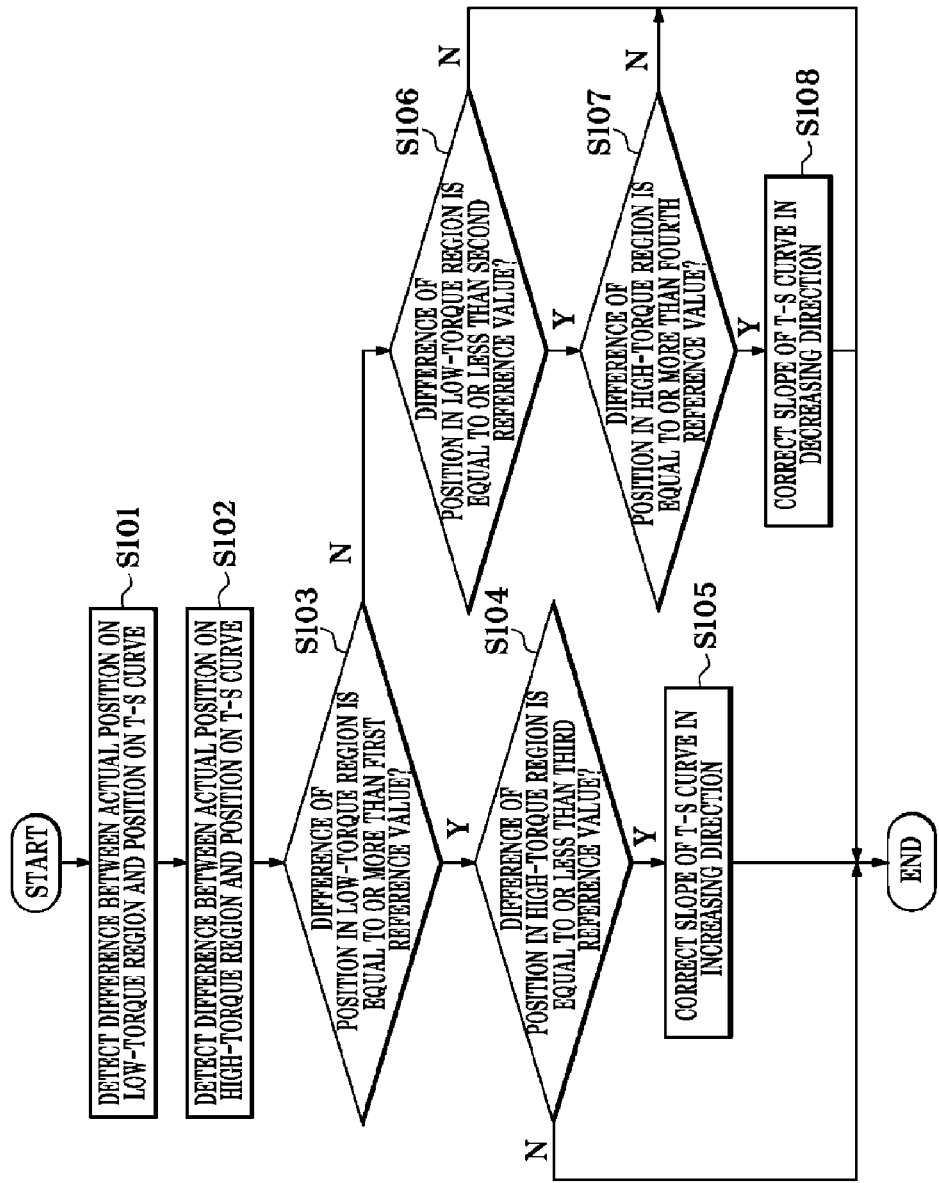
FIG. 2 is a flowchart illustrating a T-S curve correction method for a clutch system in accordance with an embodiment of the present invention.

FIG. 2 is a flowchart illustrating a T-S curve correction method for a clutch system in accordance with an embodiment of the present invention.

Figure 1:
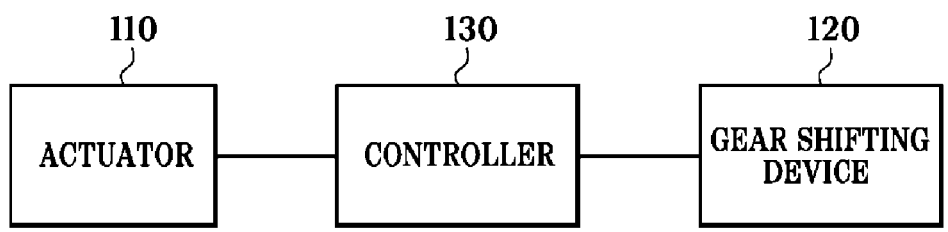
FIG. 1 is a diagram illustrating a schematic configuration of a general DCT control apparatus.

As illustrated in FIGS. 1 and 2, the controller 130 for controlling the DCT determines differences between actual positions at low and high torques and a position on a T-S curve indicating the relation between transmittable torque and clutch position, and corrects the slope of the T-S curve in the increasing or decreasing direction.

Referring to FIG. 2, the controller 130 detects a difference between an actual position of the clutch in a preset low-torque region (that is, first torque region) and a position on the T-S curve, at step S101.

Furthermore, the controller 130 detects a difference between an actual position of the clutch in a preset high-torque region (that is, second torque region) and a position on the T-S curve, at step S102.

The low-torque region (first torque region) may be differently set depending on embodiments. Furthermore, the high-torque region (the second torque region) may be set to a relative concept of the low-torque region (the first torque region).

The low-torque region (first torque region) and the high-torque region (second torque region) may be set by dividing the entire torque region into two parts, or set at both sides of an intermediate region (normal region) of the entire torque region.

For convenience of description, the present embodiment is based on the supposition that the entire torque region is divided into two parts, that is, the low-torque region (first torque region) and the high-torque region (second torque region).

When the difference between the actual position of the clutch in the low-torque region (first torque region) and the position on the T-S curve is detected at step S101, the controller 130 determines whether the difference of the position in the low-torque region (first torque region), that is, the difference between the actual position and the position on the T-S curve is equal to or more than a first reference value, at step S103.

When the difference of the position in the low-torque region (first torque region), that is, the difference between the actual position and the position on the T-S curve is equal to or more than the first reference value (example of step S103), the controller 130 determines whether the difference of the position in the high-torque region (second torque region), that is, the difference between the actual position and the position on the T-S curve is equal to less than a third reference value, at step S104.

When the difference of the position in the high-torque region (second torque region), that is, the difference between the actual position and the position on the T-S curve is equal to or less than the third reference value (example of step S104), the controller 130 corrects the slope of the T-S curve in the increasing direction, at step S105.

When the difference of the position in the low-torque region (first torque region), that is, the difference between the actual position and the position on the T-S curve is less than the first reference value (No at step S103), the controller 130 determines whether the difference of the position in the low-torque region, that is, the difference between the actual position and the position on the T-S curve is equal to less than a second reference value, at step S106.

The first and second reference values are reference values used for comparing the actual position in the low-torque region (first torque region) to the position on the T-S curve. Depending on embodiments, the first and second reference values may be set to the same value.

Then, when the difference of the position in the low-torque region (first torque region), that is, the difference between the actual position and the position on the T-S curve is equal to or less than the second reference value (example of step S106), the controller 130 determines whether the difference of the position in the high-torque region (second torque region), that is, the difference between the actual position and the position on the T-S curve is equal to or more than a fourth reference value, at step S107.

When the difference of the position in the high-torque region (second torque region), that is, the difference between the actual position and the position on the T-S curve is equal to or more than the fourth reference value (example of step S107), the controller 130 corrects the slope of the T-S curve in the decreasing direction, at step S108.

The third and fourth reference values are reference values used for comparing the actual position in the high-torque region (second torque region) to the position on the T-S curve. Depending on embodiments, the third and fourth reference values may be set to the same value.

The T-S curve correction method in accordance with the present embodiment can determine differences between actual positions at low and high torques and positions on the T-S curve and correct the slope of the T-S curve, thereby preventing an occurrence of slip or gear shifting shock.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A T-S (Torque-Stroke) curve correction method for a clutch system, comprising:

detecting, by a controller, differences between actual positions of a clutch in first and second torque regions and a position on a T-S curve;

determining, by the controller, whether the difference between the actual position in the first torque region and the position on the T-S curve is equal to or more than a first reference value;

determining, by the controller, whether the difference between the actual position in the second torque region and the position on the T-S curve is equal to or less than a third reference value, when the difference between the actual position in the first torque region and the position on the T-S curve is equal to or more than the first reference value;

correcting, by the controller, a slope of the T-S curve to be increased from a current slope of the T-S curve with a predetermined amount, when the difference between the actual position in the second torque region and the position on the T-S curve is equal to or less than the third reference value; and controlling, by the controller, a stroke of an actuator, based on the T-S curve with the corrected slope so that the clutch transmits a target torque from an engine, the actuator changing a position of the clutch, wherein the first torque region is a preset torque region in which the clutch transmits a torque less than a predetermined torque, and the second torque region is a preset torque region in which the clutch transmits a torque equal to or higher than the predetermined torque.

2. The T-S curve correction method of claim 1, further comprising:

determining, by the controller, whether the difference between the actual position in the first torque region and the position on the T-S curve is equal to or less than a second reference value, when the difference between the actual position in the first torque region and the position on the T-S curve is less than the first reference value;

determining, by the controller, whether the difference between the actual position in the second torque region and the position on the T-S curve is equal to or more than a fourth reference value, when the difference between the actual position in the first torque region and the position on the T-S curve is equal to or less than the second reference value; and correcting, by the controller, the slope of the T-S curve to be decreased from the current slope of the T-S curve with a predetermined amount when the difference between the actual position in the second torque region and the position on the T-S curve is equal to or more than the fourth reference value.

3. The T-S curve correction method of claim 1, wherein a second reference value is additionally used as a reference value for comparing the actual position in the first torque region to the position on the T-S curve, in addition to the first reference value.

4. The T-S curve correction method of claim 3, wherein the first and second reference values are set to the same value in the first torque region.

5. The T-S curve correction method of claim 1, wherein a fourth reference value is additionally used as a reference value for comparing the actual position in the second torque region to the position on the T-S curve, in addition to the third reference value.

6. The T-S curve correction method of claim 5, wherein the third and fourth reference values are set to the same value in the second torque region.

* * * * *